(12) United States Patent
Lee (10) Patent No.: US 9,920,833 B2
(45) Date of Patent: Mar. 20, 2018

(54) SHIFTING APPARATUS FOR MANUAL TRANSMISSION

(71) Applicants: HYUNDAI MOTOR COMPANY, Seoul (KR); KIA MOTORS CORPORATION, Seoul (KR)

(72) Inventor: Kyung Woo Lee, Gunpo-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 216 days.

(21) Appl. No.: 14/684,310

(22) Filed: Apr. 10, 2015

(65) Prior Publication Data

US 2016/0109023 A1 Apr. 21, 2016

(30) Foreign Application Priority Data

Oct. 15, 2014 (KR) ........................ 10-2014-0138845

(51) Int. Cl.
| | | |
|---|---|---|
| *B60K 20/00* | (2006.01) | |
| *F16H 63/32* | (2006.01) | |
| *F16H 63/20* | (2006.01) | |
| *F16H 63/30* | (2006.01) | |

(52) U.S. Cl.
CPC ............. *F16H 63/32* (2013.01); *F16H 63/20* (2013.01); *F16H 63/30* (2013.01); *F16H 2063/208* (2013.01); *F16H 2063/3076* (2013.01); *F16H 2063/3083* (2013.01); *F16H 2063/325* (2013.01)

(58) Field of Classification Search
CPC ........ F16H 63/20; F16H 63/32; F16H 63/206; F16H 63/304; F16H 2063/208; F16H 2063/321; F16H 2063/3063; F16H 2063/3059; F16H 61/02; F16H 61/26; F16H 61/28; F16H 61/32; F16H 59/041; F16H 59/042; F16H 2061/2869
See application file for complete search history.

(56) References Cited

U.S. PATENT DOCUMENTS

| | | | | | |
|---|---|---|---|---|---|
| 1,938,796 | A | * | 12/1933 | Bernard | .................. F16H 61/18 |
| | | | | | 74/473.21 |
| 4,275,614 | A | * | 6/1981 | Okubo | .................. F16H 59/042 |
| | | | | | 267/150 |

(Continued)

FOREIGN PATENT DOCUMENTS

| | | |
|---|---|---|
| JP | 2009-168217 A | 7/2009 |
| JP | 2012-026540 A | 2/2012 |

(Continued)

OTHER PUBLICATIONS

Korean Notice of Allowance dated May 25, 2016 issued in Korean Patent Application No. 10-2014-0138845.

*Primary Examiner* — Zakaria Elahmadi
(74) *Attorney, Agent, or Firm* — McDermott Will & Emery LLP (57) ABSTRACT

A shifting apparatus for a manual transmission able to shift two shift stages, of which selection positions are different but shift positions are the same, using a single fork and a single sleeve. Compared to the related art in which a fork and a synchronization sleeve are provided to each of two independent shift stages, the full length of the transmission is reduced, thereby reducing the weight and manufacturing costs.

11 Claims, 5 Drawing Sheets

(56) References Cited

U.S. PATENT DOCUMENTS

| | | | | |
|---|---|---|---|---|
| 4,335,623 A * | 6/1982 | Kronstadt | ............... | F16H 63/20 74/473.21 |
| 4,381,682 A * | 5/1983 | Kudo | ...................... | F16H 61/18 74/473.22 |
| 4,565,108 A * | 1/1986 | Makita | ...................... | F16H 3/12 192/21.5 |
| 4,608,877 A * | 9/1986 | Okubo | .................... | F16H 63/20 74/473.1 |
| 4,682,516 A * | 7/1987 | Okubo | ................. | B60K 17/344 180/247 |
| 5,309,785 A * | 5/1994 | Knape | .................... | F16H 63/20 74/473.24 |
| 5,802,916 A * | 9/1998 | Ebinger | .................. | F16H 63/30 74/360 |
| 6,038,938 A * | 3/2000 | Szczepanski | ........... | F16H 63/20 29/527.6 |
| 6,082,514 A * | 7/2000 | Averill | .................... | F16D 11/10 180/233 |
| 6,318,206 B1 * | 11/2001 | Kramer | .................... | F16H 63/32 74/473.36 |
| 6,374,692 B1 | 4/2002 | Steinberger et al. | | |
| 6,389,919 B1 * | 5/2002 | Hennequet | ............... | F16H 63/20 74/375 |
| 6,691,590 B1 * | 2/2004 | Patzner | ................. | F16H 63/206 74/473.24 |
| 6,823,755 B2 * | 11/2004 | Koerber | .................. | F16H 61/32 74/335 |
| 8,037,780 B2 * | 10/2011 | Caenazzo | ............... | F16H 63/30 74/473.36 |
| 8,079,283 B2 * | 12/2011 | Feher | ................. | F16H 63/3408 74/473.11 |
| 2004/0108168 A1 * | 6/2004 | Bathe | .................... | F16H 57/042 184/6.12 |
| 2004/0177714 A1 * | 9/2004 | Ronge | .................... | F16H 63/206 74/473.37 |
| 2006/0169083 A1 * | 8/2006 | Matsuda | ................. | F16H 63/20 74/473.1 |
| 2007/0209466 A1 * | 9/2007 | Garabello | ............... | F16H 63/32 74/473.37 |
| 2009/0107279 A1 * | 4/2009 | Garabello | ............... | F16H 63/30 74/473.37 |
| 2009/0114050 A1 * | 5/2009 | Garabello | ............... | F16H 63/32 74/473.37 |
| 2010/0005917 A1 * | 1/2010 | Garabello | ............... | F16H 63/18 74/473.37 |
| 2010/0116076 A1 * | 5/2010 | Hoering | .................. | F16H 63/32 74/473.37 |
| 2011/0179899 A1 * | 7/2011 | Aberg | .................... | F16H 63/32 74/473.37 |
| 2012/0011955 A1 * | 1/2012 | Hada | ...................... | F16H 63/32 74/473.3 |
| 2013/0000437 A1 * | 1/2013 | Skogward | ............... | F16H 63/32 74/473.37 |
| 2013/0125693 A1 * | 5/2013 | Maitre | .................... | F16H 63/32 74/473.37 |
| 2013/0298714 A1 * | 11/2013 | Buhrke | ................... | F16H 63/30 74/473.37 |
| 2013/0305855 A1 * | 11/2013 | Skogward | ............... | F16H 63/32 74/89.14 |
| 2015/0075308 A1 * | 3/2015 | Enami | ................... | F16H 59/041 74/335 |
| 2016/0033036 A1 * | 2/2016 | Lee | ........................ | F16H 63/32 74/473.37 |

FOREIGN PATENT DOCUMENTS

| | | |
|---|---|---|
| KR | 10-2000-0045753 A | 7/2000 |
| KR | 10-568822 B1 | 4/2006 |
| KR | 10-2009-0058587 A | 6/2009 |
| KR | 10-2014-0069452 A | 6/2014 |

* cited by examiner

FIG. 1

Related Art

FIG. 2

Related Art

SHIFTING APPARATUS FOR MANUAL TRANSMISSION

CROSS REFERENCE TO RELATED APPLICATION

The present application claims the benefit of priority to Korean Patent Application Number 10-2014-0138845 filed on Oct. 15, 2014, the entire contents of which application are incorporated herein for all purposes by this reference.

TECHNICAL FIELD

The present disclosure relates to a shifting apparatus for a manual transmission capable of shifting two shift stages, of which selection positions are different but shift positions are the same, using a single fork and a single sleeve.

BACKGROUND

A manual transmission allows a driver to manually shift a gear of the transmission. The driver enables gear shifting by selectively moving a gearshift in one of a variety of shifting patterns.

Figure 1:
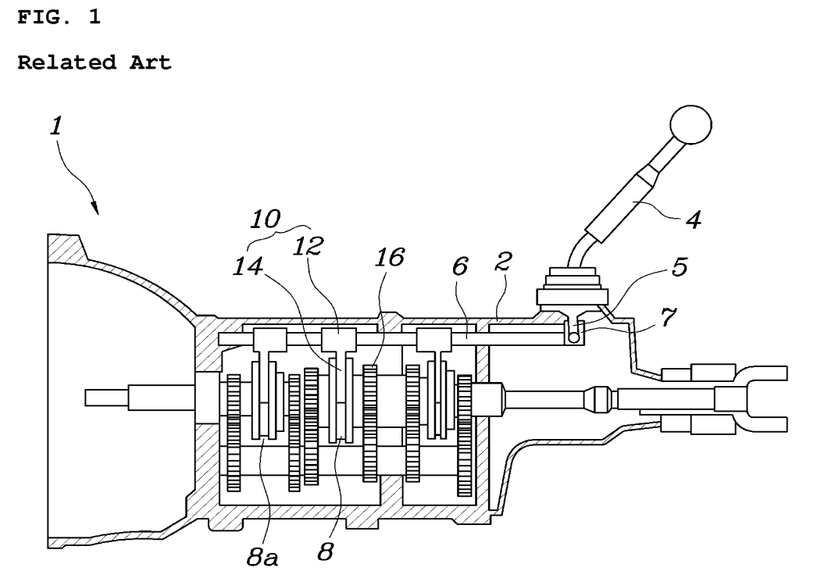
FIG. 1 is a partial cross-sectional view showing a shifting apparatus of a manual transmission of the related art.

As shown in FIG. 1, a manual transmission includes a control finger 5 connected to a shift lever 4; a plurality of shift lugs 7 connected to the control finger 5; shift rails 6, one end of each of which is connected to the corresponding shift lug 7; and a plurality of shift forks 10 fixed to the shift rails 6 and coupled with sleeves 8 that change the connection of gears. In the manual transmission of the related art, when a selecting operation is performed on the shift lever 4, the control finger 5 is connected to one of the plurality of shift lugs 7. When a shifting operation of the shift lever is performed, the shift rail 7 moves along the axis.

Accordingly, one of the shift forks 10 fixed to the shift rail 6 is also driven to move the sleeve 8. In response to the movement of the sleeve 8, gears 16 are synchronized and gear shifting is performed.

Figure 2:
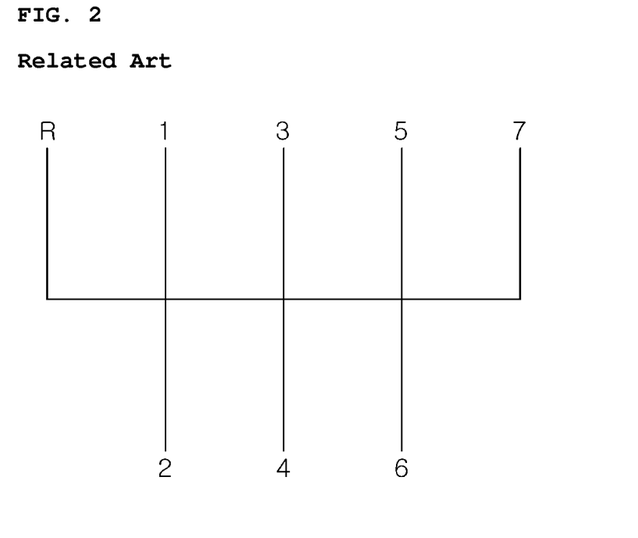
FIG. 2 is a diagram showing a shifting pattern of a 7-speed manual transmission.

As shown in FIG. 2, a 7-speed manual transmission of the related art includes 5 shift rails. In this case, the reverse (R) gear and the seventh gear have different selection positions, but their shift positions are the same, and thus, it is impossible to move the R gear and the seventh gear using a single synchronization sleeve during gear shifting.

For the gear shifting with the R gear and the seventh gear, a synchronization hub and a synchronization sleeve must be provided, respectively. However, this causes problems, such as increased manufacturing costs and an increased full length of the transmission.

Therefore, a simple structure for gears having different selection directions but the same shifting direction is necessary.

The information disclosed in the Background of the Invention section is only for the enhancement of understanding of the background of the disclosure, and should not be taken as an acknowledgment or as any form of suggestion that this information forms a prior art that would already be known to a person skilled in the art.

SUMMARY

The present disclosure has been made keeping in mind the above problems occurring in the related art, and the present disclosure is intended to propose a shifting apparatus for a manual transmission capable of shifting two shift stages, of which selection positions are different but shift positions are the same, using a single fork and a single sleeve.

According to an embodiment of the present inventive concept, a shifting apparatus for a manual transmission includes a shift shaft including a shift finger. A shift fork rotatably disposed on a transmission housing and the shift fork includes a first lug portion to which the shift finger is selectively connected, the shift fork rotating in one direction to move the sleeve in the same direction as the shift shaft moves when the shift finger is connected to the first lug. A shifting device includes a second lug portion to which the shift finger is selectively connected. The shifting device rotates the shift fork in the opposite direction such that the sleeve moves in the opposite direction as the shift shaft moves when the shift finger is connected to the second lug.

The shift finger may be symmetrical about the shift shaft axially and protrude from the shift shaft toward a first side and a second side of the shift fork such that the shift finger is selectively connected to either the first lug portion or the second lug portion.

The shift fork may be disposed on the transmission housing to be rotatable about an axis of rotation. The shift fork includes the first lug portion on an upper end at a first side of the shift fork and is connected to a second side of the shift fork to rotate a lower end portion of the shift fork.

The shifting device may include a panel fixedly disposed on the transmission housing. A lever moves on the panel in the same direction in which the shift shaft moves, has the second lug portion disposed thereon, and is rotatably connected to the shift fork.

The shift fork may include a pad contacting an outer circumference of the sleeve and connected to the lever by a rotator which protrudes outwards from and penetrates through a lower end portion of the other side of the shift fork.

The shifting device may further include a rotatable connector disposed on the axis of rotation together with the shift fork. The rotatable connector has an upper end rotatably connected to the upper end portion of the shift fork and a lower end connected to the lever.

The shift fork may include a third lug protruding in the same direction as the axis of rotation. The rotatable connector includes a receiving recess in an upper end of the rotatable connector being rotatably connected to the third lug.

The lower end of the rotatable connector may be disposed on the axis of rotation of the shift fork and is connected to the lever. A middle upper end of the rotatable connector may be rotatably connected to a shaft of the third lug. The upper end of the rotatable connector may be connected to the third lug of the shift fork by a connector.

The shift fork may be disposed on the transmission housing such that the shift fork rotates about an axis of rotation. A third lug may protrude from an upper end of the other side and is bent toward the axis of rotation such that the third lug portion is selectively connected to the shift finger by a link.

The shifting device may include a panel fixedly disposed on the transmission housing. A lever moves on the panel in the same direction in which the shift shaft moves, and the second lug portion is disposed on the lever. A rotatable connector is disposed on the axis of rotation together with the shift fork, has an upper end thereof rotatably connected to the first lug, and has a lower end thereof connected to the lever.

The shift finger may extend from the shift shaft toward a second side and may be selectively connected to the link or the second lug.

The shifting apparatus for a manual transmission having the above-described structure can shift two shift stages, of which selection positions are different but shift positions are the same, using a single fork and a single sleeve.

Accordingly, compared to the related art in which a fork and a synchronization sleeve are provided to each of two independent shift stages, the full length of the transmission is reduced, thereby reducing weight and manufacturing costs.

BRIEF DESCRIPTION OF THE DRAWINGS

The above and other objects, features and advantages of the present disclosure will be more clearly understood from the following detailed description when taken in conjunction with the accompanying drawings.

DETAILED DESCRIPTION

Reference will now be made in greater detail to a shifting apparatus for a manual transmission according to exemplary embodiments of the present inventive concept in conjunction with the accompanying drawings. The same reference numerals will be used throughout the drawings and the description to refer to the same or like parts.

The present disclosure is applied to a shift structure of a 7-speed manual transmission, as shown in FIG. 2, in which the reverse (R) gear and the seventh gear have different selection directions but the same shifting direction. The present disclosure enables the R gear and the seventh gear to be shifted using a single fork and a single synchronization sleeve.

In a manual transmission having 7-speed gears, when the R gear and the fifth gear have different selection directions but the same shifting direction, the same structure as of the present disclosure may be applied.

Figure 3:
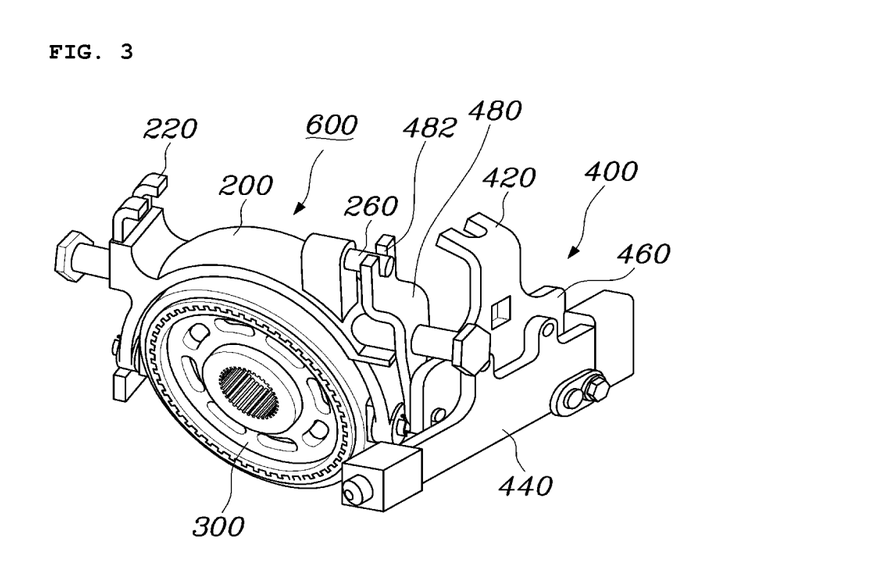
FIG. 3 is a perspective view showing a shifting apparatus for a manual transmission according to an embodiment of the inventive concept.
Figure 4:
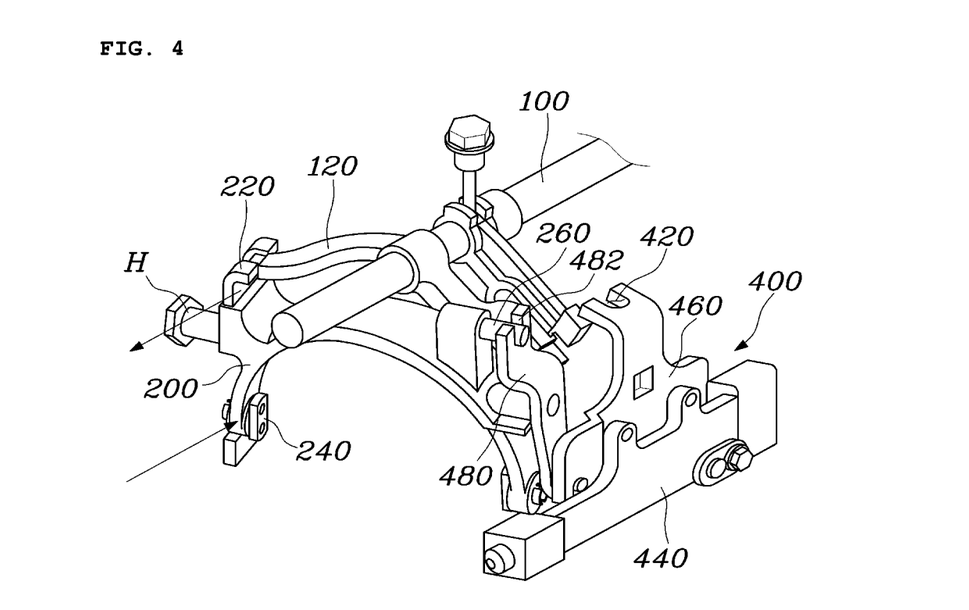
FIGS. 4 and 5 are perspective views showing the operating state of the shifting apparatus for a manual transmission shown in FIG. 3.
Figure 5:
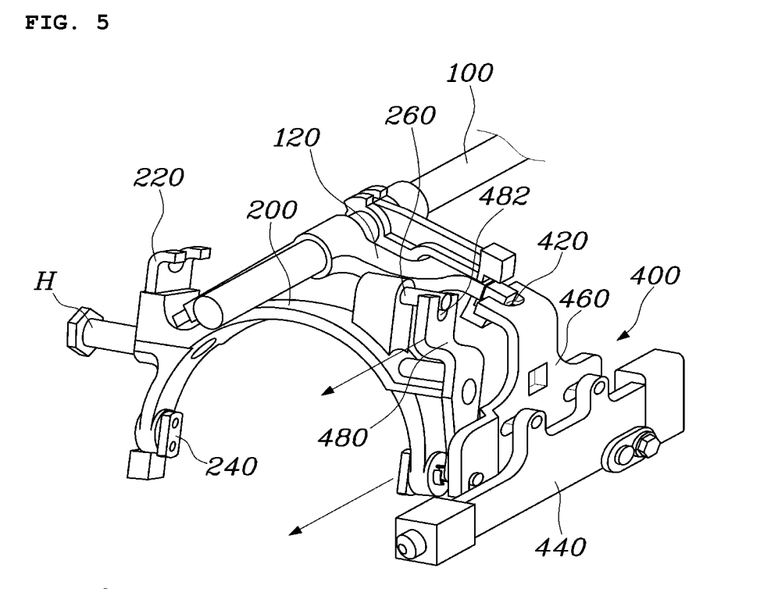

As shown in FIGS. 3 to 5, a shifting apparatus for a manual transmission according to the present disclosure includes a shaft 100, a shift fork 200, and a shifting device 400. The shaft has a shift finger 120. The shift fork 200 is rotatably disposed on a transmission housing 600 and has a first lug 220 to which the shift finger 120 is selectively connected. The shift fork 200 rotates in response to movement of the shaft 100 when the shift finger 120 is connected to the first lug 220, thereby moving a sleeve 300. The shifting device 400 has a second lug 420 to which the shift finger 120 is selectively connected. When the shift shaft 100 moves when the shift finger 120 is connected to the second lug 420, the shifting device 400 causes the shift fork 200 to rotate in the opposite direction so that the sleeve 300 moves in the opposite direction.

The shift shaft 100 of the present invention cooperates with the shift lever to move in the axial direction, and the shift finger 120 moves together with the shift shaft 100.

The shift fork 200 surrounds an outer circumference of the sleeve 300 and has the first lug 220 to which the shift finger 120 is selectively connected. Specifically, when the shift shaft 100 moves in the state the shift finger 120 is positioned at the first lug 220 through rotation, the rotation of the shift fork 200 is enabled in response to an axial movement of the first lug 220. In response to the shift fork 200 moving in this manner, the sleeve 300 moves, thereby performing a shifting operation.

Here, the sleeve 300 for the seventh gear and the R gear may have a synchronization hub.

According to the present disclosure, the shifting device 400 rotates the shift fork 200 in two opposite directions with respect to a direction in which the shift shaft 100 moves since the shifting operation must be performed using the single sleeve 300. The shifting device 400 has the second lug 420 to which the shift finger 120 is selectively connected. When the shift shaft 100 moves in the state the shift finger 120 is positioned at the second lug portion 420 through rotation, the second lug portion 420 moves in the axial direction of the shift shaft 100, causing the shift fork 200 to rotate in the opposite direction, such that shifting to another shift stage is performed. This will be described in detail later.

The present disclosure having this structure can shift two shift stages, of which selection positions are different but shift positions are the same, using the single fork and the single sleeve 300. Accordingly, compared to the related art in which a fork and a synchronization sleeve are provided to each of two independent shift stages, the full length of the transmission is reduced, thereby reducing weight and manufacturing costs.

In detail, the shift finger 120 according to the present disclosure is symmetrical toward one and other sides about the shift shaft 100 such that the shift finger 120 may be selectively connected to the first lug 220 or the second lug 420.

That is, in response to the selection operation of the shift shaft 100, the symmetrical shift finger 120 is selectively connected to the first lug 220 or the second lug 420, such that shifting to another shift stage is performed.

The shift fork 200 is disposed on the transmission housing 600 such that the shift fork 200 is rotatable about the axis of rotation H. The first lug 220 is disposed on an upper end of one side of the shift fork 200, and the shifting device 400 is connected to another side of the shift fork 200 such that a lower end of the shift fork 200 is movable. That is, even when the shift shaft rotates in one direction, when the upper end of the shift fork 200 rotates about the axis of rotation H, the shift fork 200 causes the sleeve 300 to move in the opposite direction. When the lower end rotates, the shift fork 200 causes the sleeve 300 to move in the same direction.

As shown in FIG. 4, the first lug 220 is disposed on the upper end of one side of the shift fork 200. In the state in which the shift finger 120 is connected to the first lug 220, in response to the movement of the shift shaft 100, the upper end of the shift fork 200 rotates. Here, the lower end to which the sleeve 300 is connected rotates in the opposite direction about the axis of rotation H, thereby performing the shifting operation.

In contrast, as shown in FIG. 5, when the shift finger 120 is connected to the second lug 420 of the shifting device 400, the shift fork 200 rotates in response to the movement of the shift shaft 100. In this case, the shifting device 400 causes the lower end of the shift fork 200 to rotate in the same direction as the direction in which the shift shaft 100 moves, such that the sleeve 300 moves in the same direction as the shift shaft 100, whereby shifting to another gear.

For this, the shifting device 400 includes a panel 440 and a lever 460. The panel 440 is fixedly disposed on the transmission housing. The lever 460 is disposed such that the lever 460 is movable on the panel 440 in the same direction as the direction in which the shift shaft 100 moves. The second lug 420 is disposed on the lever 460. The lever 460 is rotatably connected to the shift fork 200.

The panel 440 is fixedly disposed on the transmission housing, and has protrusions 442 along which the lever 460 slides. The lever 460 has slide holes 462 that extend in the same direction as the direction in which the shift shaft 100 so as to receive the protrusions 442 therein. This configuration allows the lever 460 to slide.

Figure 6:
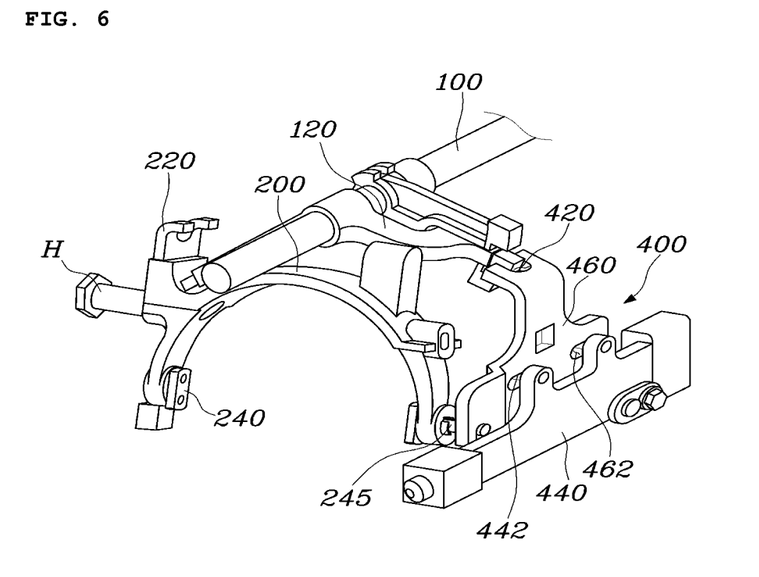
FIG. 6 is a perspective view showing a shifting apparatus for a manual transmission according to a first embodiment of the present inventive concept.

The shifting device 400 is applicable to a variety of embodiments. For example, according to a first embodiment, as shown in FIG. 6, the second lug 420 to which the shift finger 120 is selectively connected is formed on the upper end of the lever 460, and the lower end of the lever 460 is rotatably connected to the lower end of the shift fork 200.

The shift fork 200 has pads 240 that adjoin the outer circumference of the sleeve 300. A corresponding pad 240 can be connected to the lever 460 with a rotator 245 that protrudes outwards through the lower end portion of the other side of the shift fork 200.

One surface of each pad 240 adjoins the outer circumference of the sleeve 300, and another surface of each pad 240 adjoin the lower end portion of the shift fork 200. The rotating portion 245 on the other side of each pad 240 extends through the lower end portion of the shift fork 200 and is directly connected to the lever 460. Accordingly, the connecting structure between the shifting device 400 and the shift fork 200 can be simplified.

Figure 7:
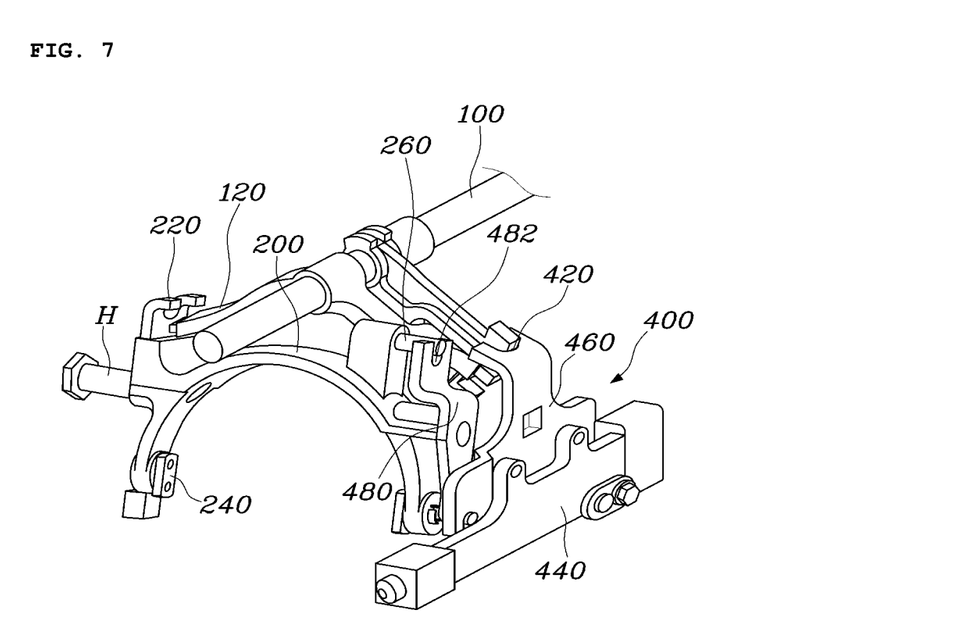
FIG. 7 is a perspective view showing a shifting apparatus for a manual transmission according to a second embodiment of the present inventive concept.

According to a second embodiment, as shown in FIG. 7, the shifting device 400 further includes a rotatable connector 480 disposed on the axis of rotation H together with the shift fork 200. The upper end of the rotatable connector 480 is rotatably connected to the upper end of the shift fork 200, and the lower end of the rotatable connector 480 is connected to the lever 460. Specifically, the rotatable connector 480 is disposed on the axis of rotation H of the shift fork 200 such that the rotatable connector 480 rotates simultaneously with the shift fork 200. The upper end of the rotatable connector 480 is connected to the upper end of the shift fork 200, and the lower end of the rotatable connector 480 is connected to the lever 460. When the lever 460 moves in response to the movement of the shift shaft 100, the lower end portion of the shift fork 200 to which the sleeve 300 is connected by the rotatable connector 480 rotates in the same direction as the direction in which the shift shaft 100 moves.

The second lug 420 is disposed on the upper end of the lever 460 such that the second lug 420 is selectively connected to the shift finger 120. The lever 460 slides along the panel 440 in the direction in which the shift shaft 100 moves. In this case, the shift finger 120 is connected to the second lug 420, and the lever 460 moves in the same direction as the shift shaft 100 when the shift shaft 100 moves, such that the lower end of the rotatable connector 480 rotates in the same direction as the shift shaft 100. Accordingly, the upper end of the rotatable connector 480 rotates about a hinge shaft of the shift fork 200 in the direction opposite to the direction in which the shift shaft 100 moves, such that the shift fork 200 connected to the upper end of the rotatable connector 480 rotates in the opposite direction.

Accordingly, the lower end of the shift fork 200 moves in the same direction in which the shift shaft 100 moves, causing the sleeve 300 to move in the same direction as the shift shaft 100.

The shift fork 200 has a third lug 260 protruding from the upper end thereof, in the same direction as the axis of rotation H, and a receiving recess 482 is formed in the upper end of the rotatable connector 480. The rotatable connector 480 and the third lug 260 can be connected to each other such that they can rotate about each other. The third lug 260 protrudes in a circular fin shape, and the receiving recess 482 of the rotatable connector 480 is in the shape of a circle surrounding the third lug 260. With this configuration, the rotation can be performed smoothly.

Figure 8:
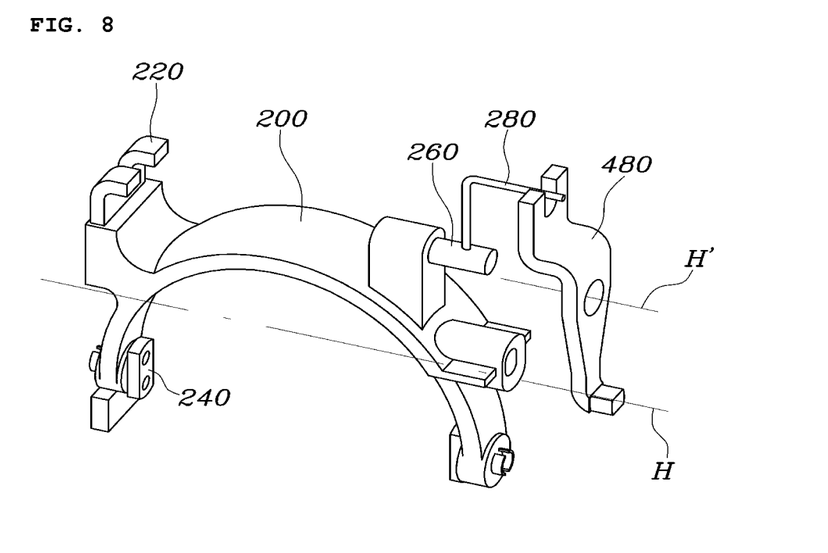
FIG. 8 is a perspective view showing a shifting apparatus for a manual transmission according to a third embodiment of the present inventive concept.

According to a third embodiment, as shown in FIG. 8, the lower end of the rotatable connector 480 is positioned on the axis of rotation H of the shift fork 200 and is connected to the lever 460. A middle end of the rotatable connector 480 is rotatably disposed on a shaft H' extending from the shift fork 200. The upper end of the rotatable connector 480 is connected to the third lug 260 of the shift fork 200 by a connector 280.

Accordingly, the rotatable connector 480 is provided as a separate part. The center of rotation of the rotatable connector 480 is positioned at the third lug 260, and the lower end of the rotatable connector 480 is disposed on the axis of rotation H of the shift fork 200. The rotatable connector 480 may be disposed on the panel 440 or the transmission housing. In this case, the upper end of the rotatable connector 480 and the third lug 260 are connected to each other by the connector 280 such that they are rotatable about each other. This configuration allows the rotatable connector 480 to rotate.

With this structure, the shift finger 120 is connected to the second lug 420 of the lever 460, and in response to the movement of the shift shaft 100, the lower end of the rotatable connector 480 connected to the lever 460 moves in the direction in which the shift shaft 100 moves. Accordingly, in response to the rotation of the rotatable connector 480, the upper end rotates in the direction opposite to the direction in which the shift shaft 100 moves. By the connector 280 connected to the upper end of the rotatable connector 480, the upper end of the shift fork 200 rotates in the same direction as the upper end of the rotatable connector 480.

Accordingly, the lower end of the shift fork 200 rotates in the same direction in which the shift shaft 100 moves, causing the sleeve 300 to move in the same direction as the shift shaft 100.

Figure 9:
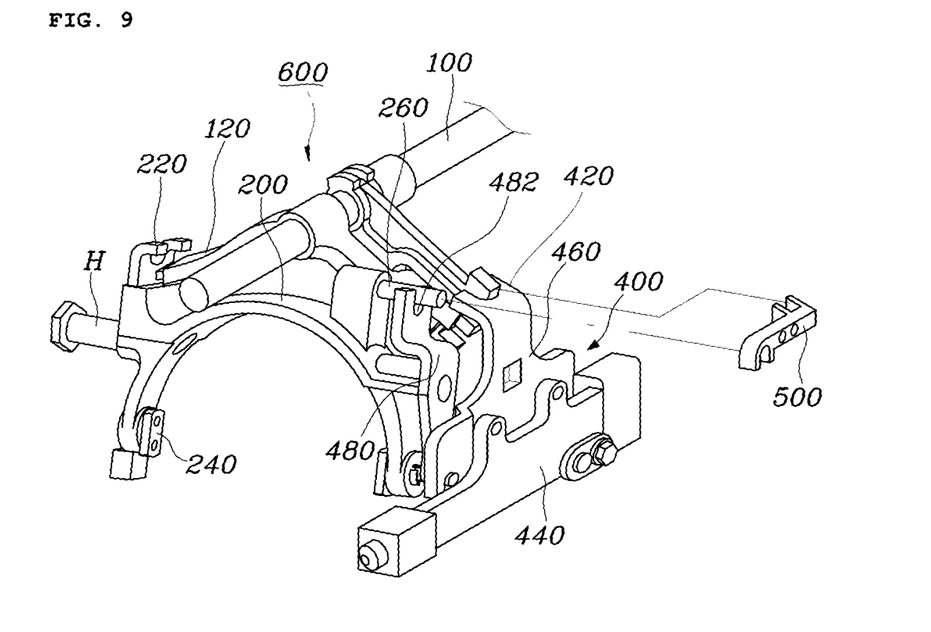
FIG. 9 is a perspective view showing a shifting apparatus for a manual transmission according to a fourth embodiment of the present inventive concept.

According to a fourth embodiment, as shown in FIG. 9, the shift fork 200 is disposed on the transmission housing 600 such that the shift fork 200 is rotatable about the axis of rotation H. The first lug 220 protrudes from the upper end of the other side of the shift fork 200, in the same direction as the axis of rotation H. A third lug 260 may be selectively connected to the shift finger 120 by a link 500.

Specifically, the third lug 260 protrudes from the shift fork 200 in the same direction as the axis of rotation H, and is selectively connected to the shift finger 120 by the link 500. One end of the link 500 is rotatably connected to the first lug 220, and another end of the link 500 is connected to the shift finger 120. The link 500 may be in the shape similar to that of the above-described lever 460.

Accordingly, in the state in which the shift finger 120 is connected to the link 500, the movement of the shift shaft 100 causes the upper end portion of the shift fork 200 to rotate by the link 500, and the lower end of the shift fork 200 rotates in the direction opposite to the shift shaft 100 in a responsive manner. Accordingly, the sleeve 300 moves in the direction opposite to the direction in which the shift shaft 100 moves.

In contrast, the shifting device 400 allowing the sleeve 300 to move in the same direction as the shift shaft 100 may have the following configuration. The panel 440 is fixed to the transmission housing 600. The lever 460 is movable by sliding in the same direction in which the shift shaft 100 moves, and has the second lug 420. The rotatable connector 480 is disposed on the axis of rotation H together with the shift fork 200. The upper end of the rotatable connector 480 is rotatably connected to the first lug 220, and the lower end of the rotatable connector 480 is connected to the lever 460.

With this structure, the shift finger 120 is connected to the second lug 420. The lever 460 moves in the same direction as the shift shaft 100 in response to the movement of the shift shaft 100, such that the lower end of the rotatable connector 480 rotates in the same direction as the shift shaft 100. Accordingly, the upper end of the rotatable connector 480 rotates in the direction opposite to the lower end. In response to the first lug 220 of the shift fork 200 being connected to the upper end of the rotatable connector 480, the upper end of the shift fork 200 rotates in the direction opposite to the shift shaft 100.

Accordingly, the lower end of the shift fork 200 moves in the same direction in which the shift shaft 100 moves, such that the sleeve 300 moves in the same direction as the shift shaft 100.

In this case, the shift finger 120 may extend from the shift shaft 100 toward the other side such that the shift finger 120 is selectively connected to the link 500 or the second lug 420. Specifically, since both the link 500 and the second lug 420 are positioned at the other side of the shift fork 200, only the single shift finger 120 is provided such that the shift finger 120 is connected to the link 500 or the second lug 420 while rotating.

Regarding the direction in which the shift shaft 100 moves as described above, it is possible to set the gear shifting such that the gear shifting is performed toward the R gear when the sleeve 300 disposed on the shift fork 200 moves in the same direction as the shift shaft 100 and toward the seventh gear when the sleeve 300 moves in the direction opposite to the shift shaft 100.

According to the present disclosure as set forth above, it is possible to shift two shift stages, of which the selection directions are different but the shift directions are the same, using a single fork and a single synchronization sleeve.

When the shift shaft 100 moves in the same direction, the sleeve 300 is movable in one direction. In contrast, through the application of a variety of embodiments of the shifting device 400, the sleeve 300 is adapted to be movable in the opposite direction, thereby shifting two shift stages.

Accordingly, comparing to the related art in which a fork and a synchronization sleeve are provided to each of two independent shift stages, the full length of the transmission is reduced, thereby reducing the weight and manufacturing costs.

Although the exemplary embodiments of the present inventive concept have been described for illustrative purposes, those skilled in the art will appreciate that various modifications, additions and substitutions are possible, without departing from the scope and spirit of the present disclosure as disclosed in the accompanying claims.

What is claimed is:

1. A shifting apparatus for a manual transmission comprising:
 a shift shaft comprising a shift finger;
 a shift fork rotatably disposed on a transmission housing, the shift fork comprising a first lug to which the shift finger is selectively connected, so that the shift fork rotates in a first direction as the shift shaft moves, thereby moving a sleeve in a direction opposite to the shift shaft when the shift finger is connected to the first lug; and
 a shifting device comprising a second lug to which the shift finger is selectively connected,
 wherein when the shift finger is connected to the second lug, when the shift shaft moves, the shifting device rotates the shift fork in a second direction, opposite the first direction, such that the sleeve moves in the same direction as the shift shaft.

2. The shifting apparatus according to claim 1, wherein the shift finger is symmetrical about the shift shaft axially and protrudes from the shift shaft toward first side and second side of the shift fork such that the shift finger is selectively connected to either the first lug or the second lug.

3. The shifting apparatus according to claim 1, wherein the shift fork is disposed on the transmission housing to be rotatable about an axis of rotation and comprises the first lug on an upper end at a first side of the shift fork, and the shifting device is connected to a second side of the shift fork to rotate a lower end of the shift fork.

4. The shifting apparatus according to claim 3, wherein the shifting device comprises:
 a panel fixedly disposed on the transmission housing; and
 a lever moving on the panel in the same direction in which the shift shaft moves, having the second lug disposed thereon, and rotatably connected to the shift fork.

5. The shifting apparatus according to claim 4, wherein the shift fork comprises a pad contacting an outer circumference of the sleeve and connected to the lever by a rotator which protrudes outwards from and penetrating through a lower end of the second side of the shift fork.

6. The shifting apparatus according to claim 4, wherein the shifting device further comprises a rotatable connector disposed on the axis of rotation together with the shift fork, having an upper end thereof rotatably connected to the upper end of the shift fork, and having a lower end thereof connected to the lever.

7. The shifting apparatus according to claim 6, wherein the shift fork comprises a third lug protruding in the same direction as the axis of rotation, and the rotatable connector comprises a receiving recess in an upper end of the rotatable connector, the receiving recess being rotatably connected to the third lug.

8. The shifting apparatus according to claim 7, wherein the lower end of the rotatable connector is disposed on the axis of rotation of the shift fork and is connected to the lever, a middle upper end of the rotatable connector is rotatably connected to a shaft of the third lug, and the upper end of the rotatable connector is connected to the third lug of the shift fork by a connector.

9. The shifting apparatus according to claim 1, wherein the shift fork is disposed on the transmission housing such that the shift fork rotates about an axis of rotation, and a third lug protrudes from an upper end of the other side and is bent toward the axis of rotation such that the third lug is selectively connected to the shift finger by a link.

10. The shifting apparatus according to claim 9, wherein the shifting device comprises:
- a panel fixedly disposed on the transmission housing;
- a lever movable on the panel in the same direction in which the shift shaft moves and having the second lug disposed thereon; and
- a rotatable connector disposed on the axis of rotation together with the shift fork, having an upper end thereof rotatably connected to the first lug, and having a lower end thereof connected to the lever.

11. The shifting apparatus according to claim 9, wherein the shift finger extends from the shift shaft toward a second side and is selectively connected to the link or the second lug.

\* \* \* \* \*